United States Patent
Hellman et al.

(10) Patent No.: US 10,377,315 B2
(45) Date of Patent: Aug. 13, 2019

(54) IN-BOARD SEAT STORAGE

(71) Applicant: Ford Global Technologies, LLC, Dearborn, MI (US)

(72) Inventors: Kristin Ann Hellman, Walled Lake, MI (US); Christian J. Hosbach, Taylor, MI (US); Artur Stanislavovich Sakarian, Ann Arbor, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 15/406,964

(22) Filed: Jan. 16, 2017

(65) Prior Publication Data

US 2018/0201196 A1 Jul. 19, 2018

(51) Int. Cl.
*B60R 7/00* (2006.01)
*B60Q 3/225* (2017.01)
*B60N 3/10* (2006.01)
*B60R 11/02* (2006.01)
*B60R 11/00* (2006.01)

(52) U.S. Cl.
CPC ............. *B60R 7/005* (2013.01); *B60N 3/102* (2013.01); *B60Q 3/225* (2017.02); *B60R 11/02* (2013.01); *B60R 2011/0015* (2013.01); *B60R 2011/0082* (2013.01)

(58) Field of Classification Search
CPC ....... B64D 11/0627; A47C 7/62; A47C 7/622; A47C 7/624; B60R 7/043
USPC ........................................ 297/188.01, 188.04
See application file for complete search history.

(56) References Cited

U.S. PATENT DOCUMENTS

| | | | | |
|---|---|---|---|---|
| 1,527,056 A * | 2/1925 | Martin | ............... | B60R 7/043 224/566 |
| 4,474,407 A * | 10/1984 | Nazar | ............... | A47C 1/146 297/183.3 |
| 5,358,307 A * | 10/1994 | Shafer | ............... | B60R 7/043 224/275 |
| 5,383,727 A * | 1/1995 | Rife | ............... | A45C 11/00 150/900 |
| 5,868,294 A | 2/1999 | Webster | | |
| 6,095,471 A | 8/2000 | Huang | | |
| 6,161,896 A | 12/2000 | Johnson et al. | | |
| 6,419,313 B1 | 7/2002 | Newman | | |
| 6,485,097 B1 * | 11/2002 | Yuzawa | ............... | B60N 3/102 297/188.01 |
| 6,520,575 B1 | 2/2003 | Yuzawa | | |
| 7,195,314 B2 * | 3/2007 | Spence | ............... | B60N 2/2851 297/188.01 |
| 7,523,985 B2 | 4/2009 | Bhatia et al. | | |
| 7,600,817 B2 * | 10/2009 | Kramer | ............... | A47C 1/022 297/354.13 |
| 7,611,183 B2 | 11/2009 | Burkey et al. | | |
| 8,152,234 B2 * | 4/2012 | Terleski | ............... | B64D 11/0636 297/188.04 |
| 8,674,211 B1 * | 3/2014 | Palmer | ............... | H02S 30/20 136/244 |

(Continued)

*Primary Examiner* — Jose V Chen
(74) *Attorney, Agent, or Firm* — Vichit Chea; Price Heneveld LLP

(57) ABSTRACT

A vehicle seating assembly includes a seat and a seatback. The seatback further includes a compartment in a side portion of the seatback. The compartment is pivotably and resiliently coupled to the side portion.

19 Claims, 11 Drawing Sheets

(56) References Cited

U.S. PATENT DOCUMENTS

| | | | | |
|---|---|---|---|---|
| 8,878,393 B2 * | 11/2014 | Kirby | ............... | H04B 5/0037 |
| | | | | 307/104 |
| 9,155,396 B2 * | 10/2015 | Hutchinson | ............... | A47C 7/62 |
| 9,216,695 B2 * | 12/2015 | Gagnier | ............... | B60R 7/043 |
| 9,307,840 B2 * | 4/2016 | Restrepo | ............... | A47C 7/62 |
| 9,428,932 B2 * | 8/2016 | Daly | ............... | A47C 7/62 |
| 9,462,796 B1 * | 10/2016 | Ellis | ............... | A01K 97/22 |
| 9,573,528 B1 * | 2/2017 | Line | ............... | B60R 7/005 |
| 2003/0075957 A1 * | 4/2003 | Kain | ............... | B60N 2/2866 |
| | | | | 297/188.01 |
| 2007/0235483 A1 | 10/2007 | Konet | | |
| 2012/0043789 A1 | 2/2012 | Lee | | |
| 2012/0235451 A1 * | 9/2012 | Hrdlicka | ............... | B60R 7/043 |
| | | | | 297/188.2 |
| 2012/0292956 A1 * | 11/2012 | Gaudreau, Jr. | ............... | B60N 3/103 |
| | | | | 297/188.04 |
| 2012/0299340 A1 * | 11/2012 | Krasley | ............... | A47C 7/68 |
| | | | | 297/188.14 |
| 2013/0049412 A1 * | 2/2013 | Fisher | ............... | A47C 3/16 |
| | | | | 297/135 |
| 2013/0229035 A1 * | 9/2013 | Dinger | ............... | B60N 2/80 |
| | | | | 297/188.01 |
| 2013/0292976 A1 * | 11/2013 | Kane | ............... | A47C 7/62 |
| | | | | 297/188.13 |
| 2016/0046240 A1 | 2/2016 | Lara sandoval et al. | | |
| 2016/0249073 A1 * | 8/2016 | Margis | ............... | H04N 21/2146 |

\* cited by examiner

IN-BOARD SEAT STORAGE

FIELD OF THE DISCLOSURE

The present disclosure generally relates to storage compartments. More specifically, the present disclosure relates to storage compartments in a vehicle seating assembly.

BACKGROUND OF THE INVENTION

Storage compartments in vehicles are often highly sought after by consumers. The storage compartments are utilized on a regular basis and for various purposes. However, many storage compartments may not be easily accessible to the driver of the vehicle.

SUMMARY OF THE INVENTION

According to one aspect of the present disclosure, a vehicle seating assembly includes a seat and a seatback. The seatback further includes a compartment in a side portion of the seatback. The compartment is pivotably coupled to the side portion at a lower region and resiliently coupled to the side portion at an upper region. The resilient coupling of the side portion at the upper region biases the compartment to a closed position. The compartment is equipped with retention material along vertical sections of the compartment that retain items stored in the compartment when the compartment is in an open position.

According to another aspect of the present disclosure, a vehicle seating assembly includes a seat and a seatback. The seatback further includes a compartment in a side portion of the seatback. The compartment is pivotably coupled to the side portion at a lower region and resiliently coupled to the side portion at an upper region. The resilient coupling of the side portion at the upper region biases the compartment to a closed position.

According to yet another aspect of the present disclosure, a vehicle seating assembly includes a seat and a seatback. The seatback further includes a compartment in a side portion of the seatback. The compartment is pivotably and resiliently coupled to the side portion.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 2:
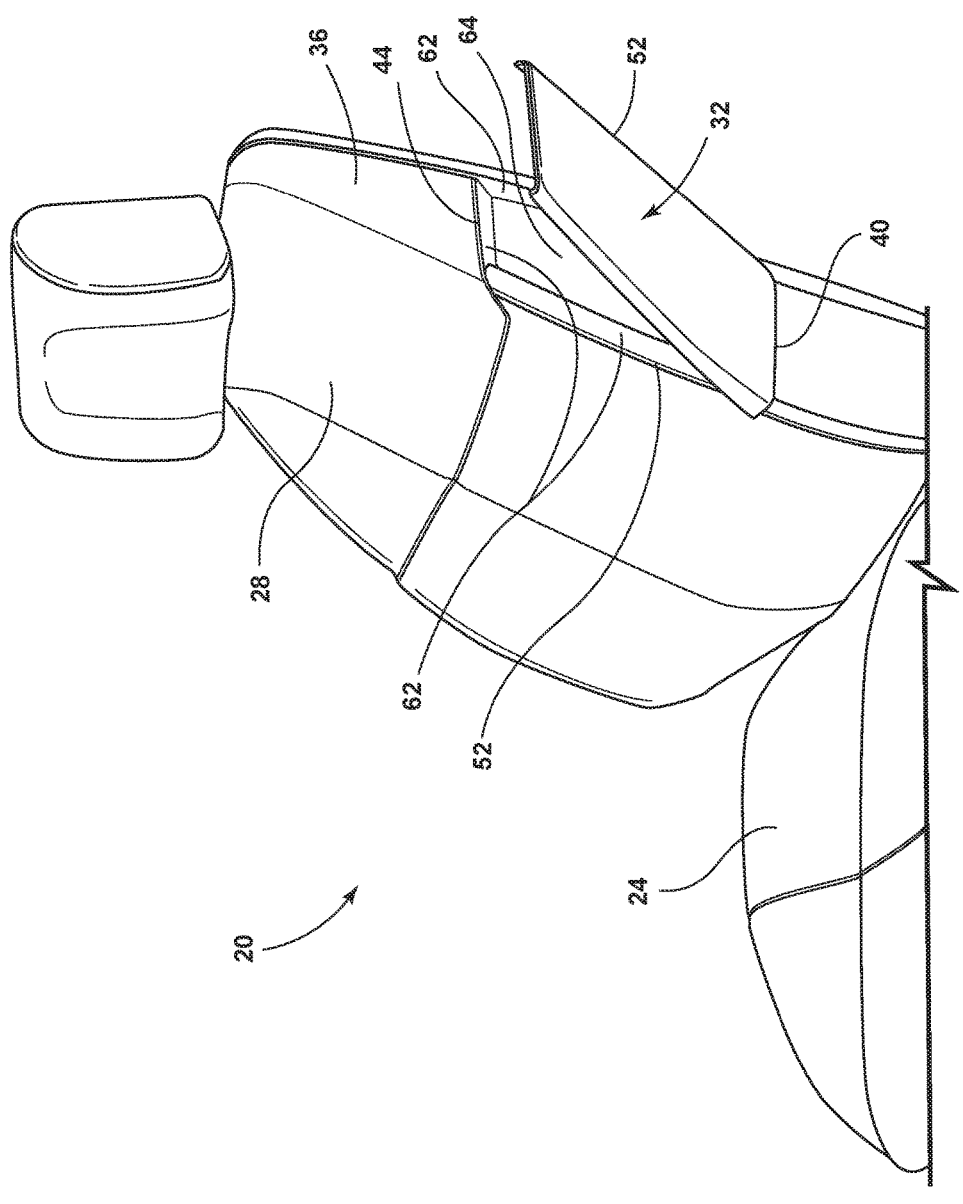
FIG. 2 is a side perspective view of one of the vehicle seating assemblies having a storage compartment in an open position, according to one embodiment.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a storage compartment in a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11, a vehicle seating assembly 20 is shown according to various embodiments having a seat 24 and a seatback 28 with a deployable compartment 32 for storage of items. The vehicle seating assembly 20 has the compartment 32 is provided in a side portion 36 of the seatback 28 and is pivotably coupled to the side portion 36 at a lower side 40. The compartment 32 is resiliently coupled to the side portion 36 at an upper region 44 of the compartment 32. The resilient coupling of the side portion 36 at the upper region 44 biases the compartment 32 to a closed position. The compartment 32 is equipped with retention material 48 along vertical sections 52 of the compartment 32. The retention material 48 retains items that are stored in the compartment 32 when the compartment 32 is in an open position.

Figure 1:
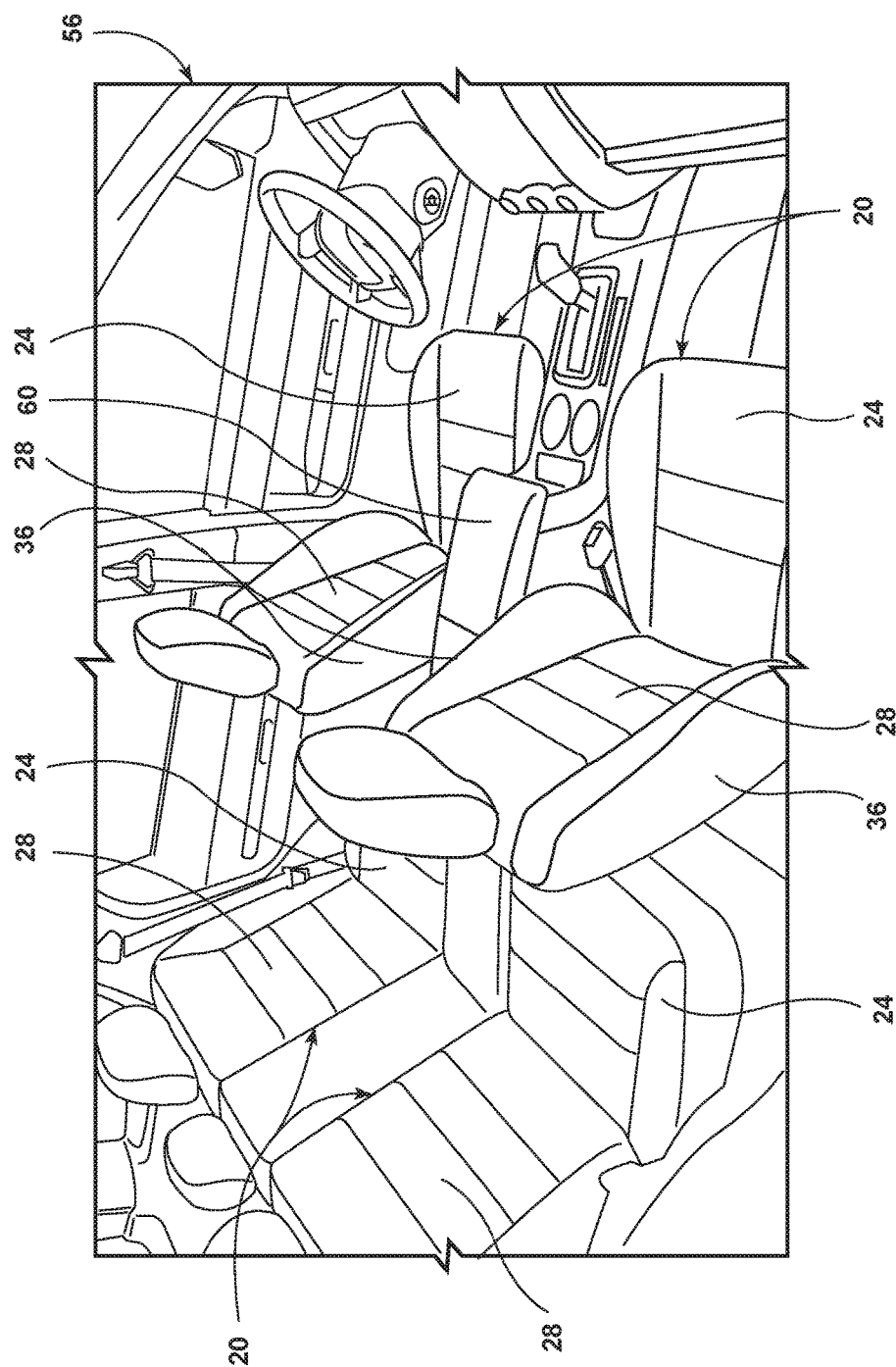
FIG. 1 is a top perspective view of an interior of a vehicle equipped with seating assemblies.

Referring now to FIG. 1, a vehicle cabin 56 is shown equipped with a plurality of vehicle seating assemblies 20 in the front of the vehicle cabin 56 and the rear of the vehicle cabin 56. The vehicle cabin 56 can further include a center console 60 positioned between the vehicle seating assemblies 20 in the front of the vehicle cabin 56. The center console 60 can extend from between the vehicle seating assemblies 20 in the front of the vehicle cabin 56 to a forward extreme of the vehicle cabin 56. The forward extreme of the vehicle cabin 56 can be, for example, the fire wall that separates the engine compartment from the vehicle cabin 56.

Referring to FIG. 2, one of the vehicle seating assemblies 20 is shown having the compartment 32 in the side portion 36. The compartment 32 is pivotably coupled to the side portion 36 of the seatback 28 at the lower side 40 of the compartment 32. The vehicle seating assembly 20, as shown in this embodiment, does not include retention material 48 on the vertical sections 52 of the compartment 32. The compartment 32 is movable between a first position and a second position. The first position can be an open position in which the compartment 32 is accessible and the second position can be a closed position. The closed position can provide a continuous exterior surface or seamless surface of the compartment 32 such that the compartment 32 minimizes protrusions that can snag, catch, scratch, cut, or otherwise impede the continuity of the surface of the vehicle seating assembly 20. The side portion 36 of the seatback 28 can have recessed edges 62 and a planar central region 64 that correspond with the dimensions and positioning of the compartment 32. The recessed edges 62 provide a cavity within the compartment 32 while the compartment 32 is in the closed position.

Figure 3:
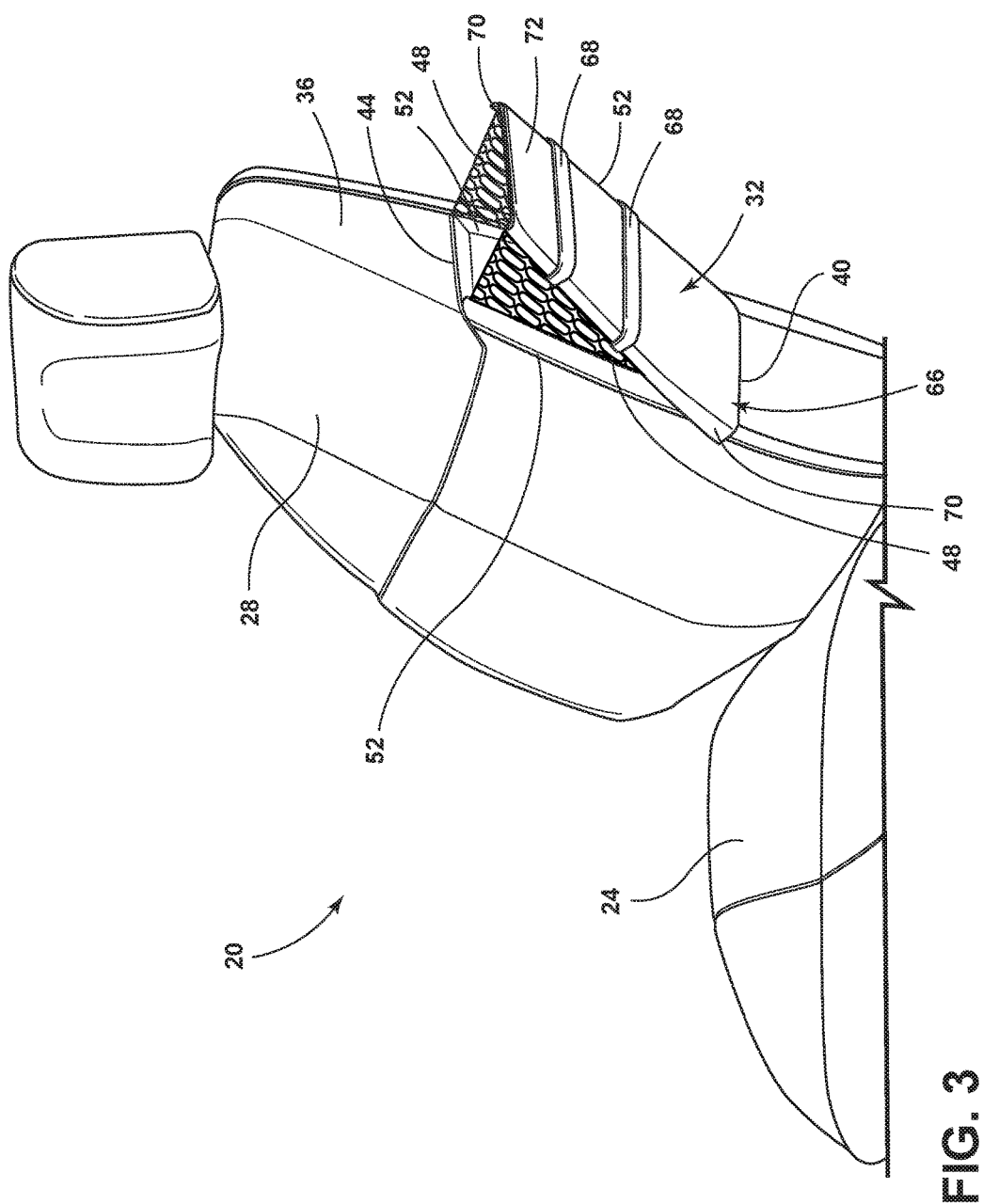
FIG. 3 is a side perspective view of the vehicle seating assembly shown in FIG. 2 with the storage compartment in the open position, according to another embodiment.

Referring to FIG. 3, the compartment 32 of the vehicle seating assembly 20 can be equipped with retention material 48 on the vertical sections 52 of the compartment 32 according to one embodiment. The retention material 48 is configured to retain items stored in the compartment 32 when the compartment 32 is in the open position. The retention material 48 can be configured to resemble a web-like structure, a grid-like structure, a hexagonal structure, or generally include a pattern that incorporates open areas and areas having material. The retention material 48 can be an elastic material that is resilient and stretches and contracts. Alternatively, the retention material 48 can be continuous such that the vertical sections 52 of the compartment 32 are defined by the retention material 48 when the compartment 32 is in the open position. The compartment 32 can be resiliently coupled to the side portion 36 of the seatback 28. The resilient coupling of the compartment 32 to the side portion 36 of the seatback 28 can be positioned at the upper region 44. Alternatively, the resilient coupling of the compartment 32 to the side portion 36 of the seatback 28 can be positioned along the length of the vertical sections 52. That is, the resilient coupling can be positioned at more than one location along the length of the vertical sections 52 of the compartment 32. In yet another alternative, the resilient coupling of the compartment 32 to the side portion 36 of the seatback 28 can be accomplished by a spring, such as a torsion spring, incorporated at the lower side 40, for example, in a pivot mechanism of the compartment 32. The resilient coupling biases the compartment 32 to the closed position.

Referring again to FIG. 3, a door 66 of the compartment 32 can include at least one resilient strap 68 operably coupled thereto and extending over an exterior surface of the door 66. The door 66 can include generally arcuate side portions 70 and a contoured central portion 72. The generally arcuate side portions 70 are configured to substantially correspond with the shape of the side portion 36 of the seatback 28 such that the exterior surface of the generally arcuate side portions 70 is continuous with the surface of the seatback 28 and/or the side portion 36. The contoured central portion 72 of the door 66 can be planar, follow the shape of the side portion 36 of the seatback 28, or extend beyond the surface of the side portion 36 of the seatback 28. That is, the contoured central portion 72 of the door 66 can be provided with a "bulge" to increase the interior storage volume of the compartment 32. In embodiments that provide the bulge at the contoured central portion 72, it is beneficial, but not necessary, to taper or provide a smooth transition between the contoured central portion 72 and the side portion 36 of the seatback 28. Each end of the resilient strap 68 can be operably coupled to an interior surface of the door 66, such as the interior surface of the generally arcuate side portions 70. Alternatively, each end of the resilient strap 68 can be operably coupled to an edge of the door 66, such as the edge of the generally arcuate side portions 70. In yet another alternative, each end of the resilient strap 68 can be operably coupled to the exterior surface of the door 66, such as the exterior surface of the generally arcuate side portions 70.

Figure 4:
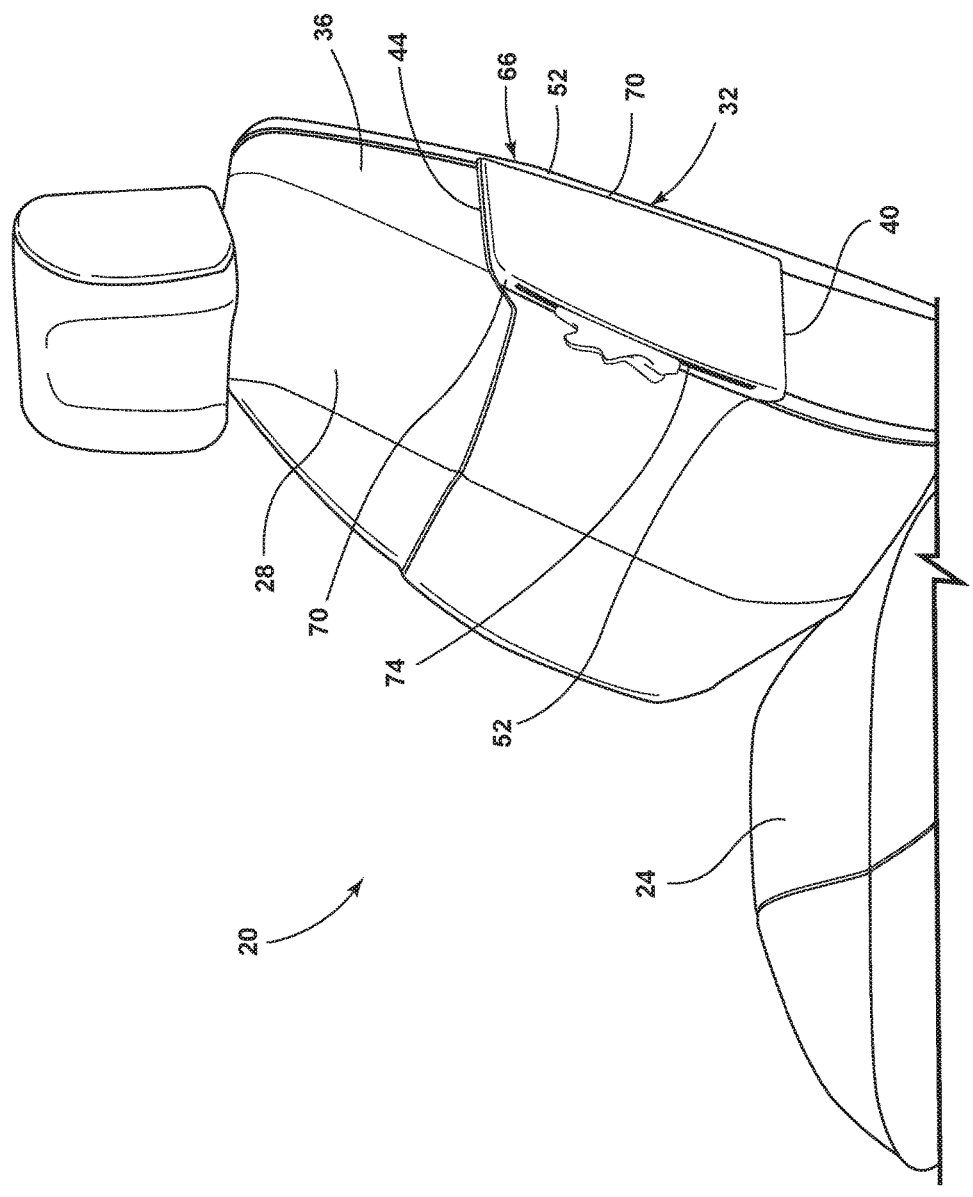
FIG. 4 is a side perspective view of the vehicle seating assembly shown in FIG. 2 with the storage compartment in a closed position, according to still another embodiment.
Figure 5:
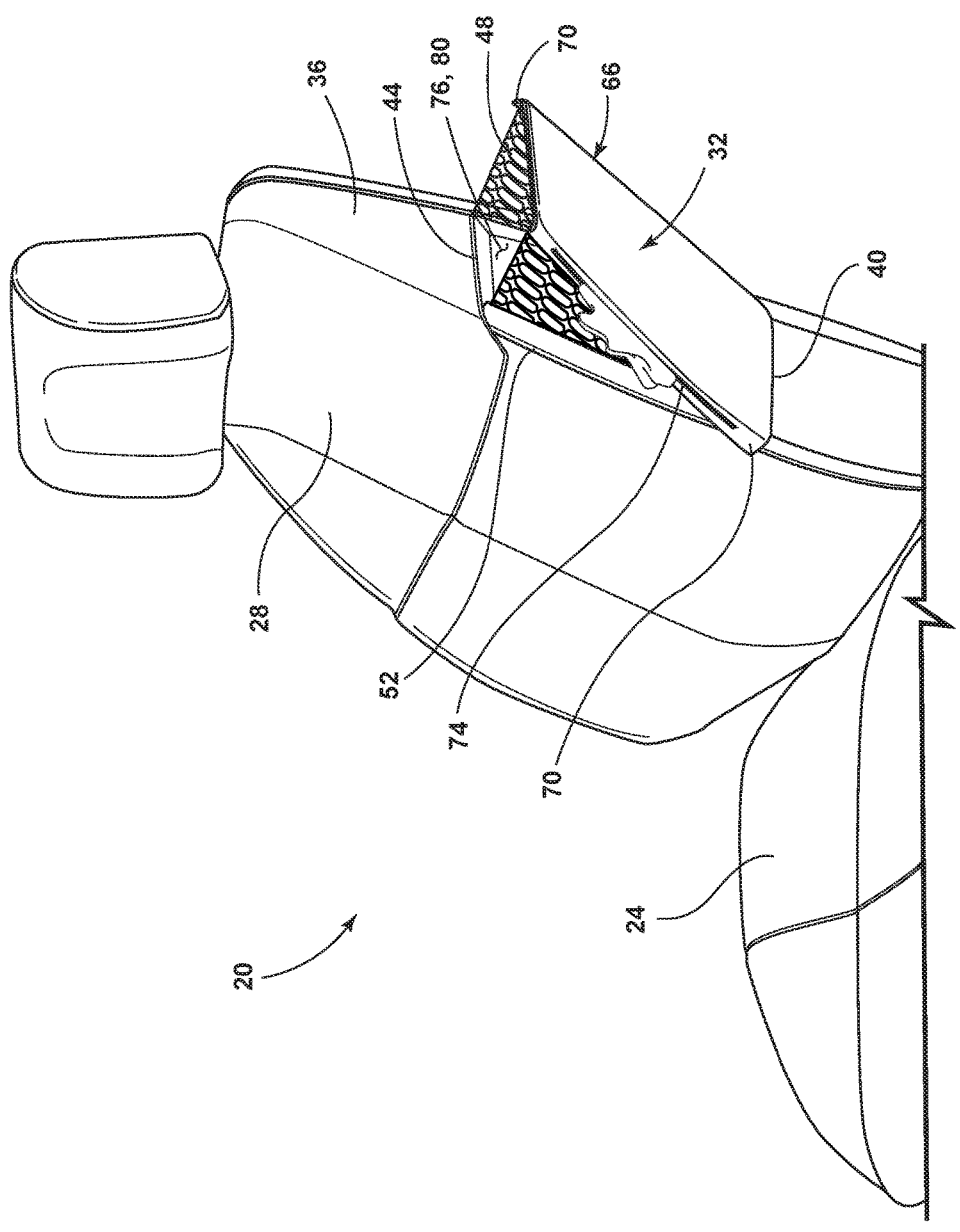
FIG. 5 is a side perspective view of the vehicle seating assembly shown in FIG. 4 with the storage compartment in the open position, according to yet another embodiment.
Figure 6:
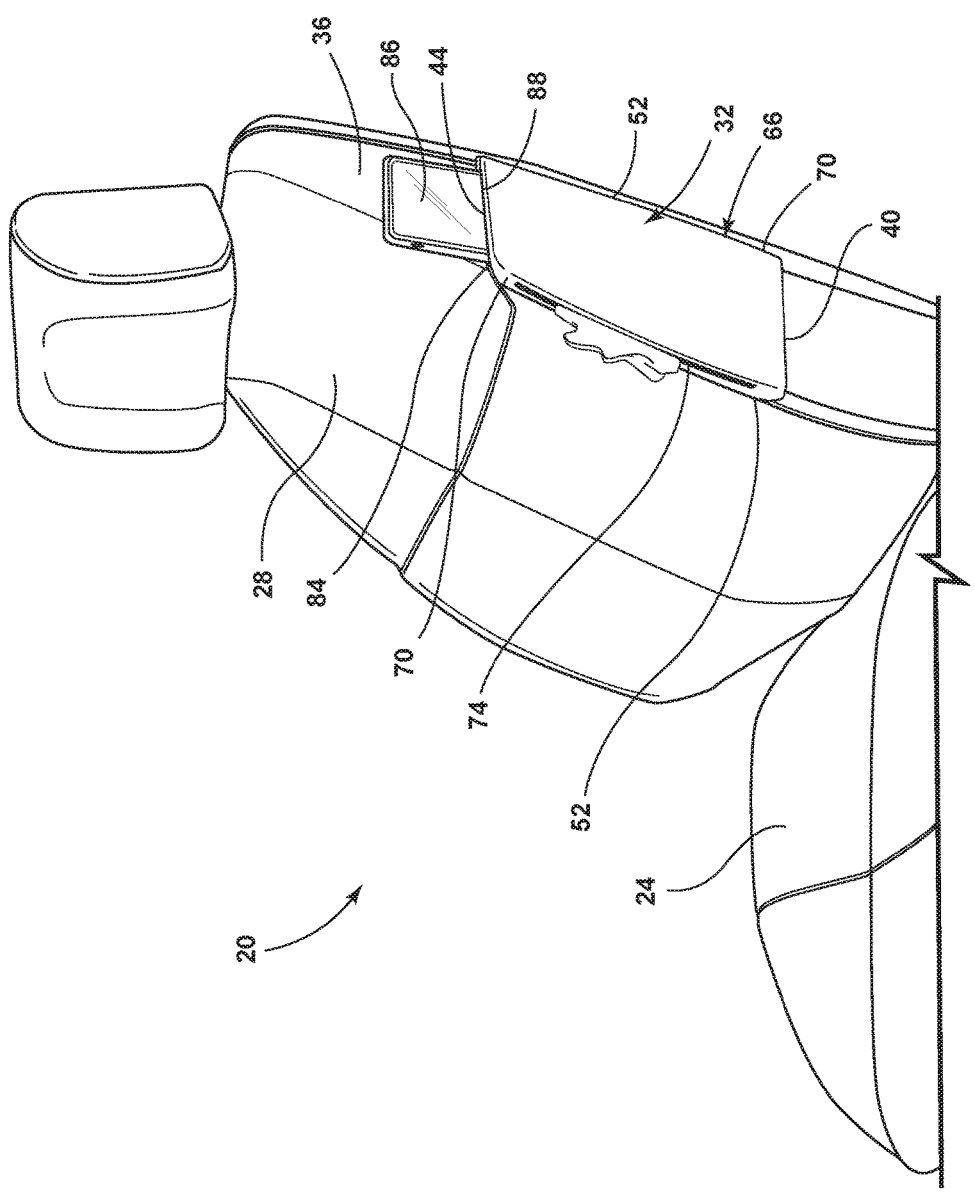
FIG. 6 is a side perspective view of the vehicle seating assembly shown in FIG. 4 having the storage compartment in the closed position with an electronic device stored therein, according to another embodiment.

Referring now to FIGS. 4-6, the compartment 32 can be equipped with a tissue holder 74 according to another embodiment. The tissue holder 74 can be positioned within the door 66 of the compartment 32. By so positioning the tissue holder 74 within the door 66 of the compartment 32, the tissue holder 74 is accessible while the compartment 32 is in either the open or closed position. The tissue holder 74 can have an opening for accessing the tissues held by the tissue holder 74 that extends along at least one of the generally arcuate side portions 70 to provide access to tissues by front and/or rear seating assembly 20 passengers. In the depicted embodiment, the compartment 32 can include the retention material 48 on the vertical sections 52 of the compartment 32. Additionally, the compartment 32 can be equipped with at least one pocket 76 located within the compartment 32. The at least one pocket 76 can include a first pocket 80 and a second pocket 84. For example, the first pocket 80 can be larger than the second pocket 84. At least one of the first pocket 80 and second pocket 84 can be provided with electrical power. The electrical power provided to the first pocket 80 and/or the second pocket 84 can be used to charge an electronic device 86, such as a cell phone. The electronic device 86 in at least one of the first pocket 80 and the second pocket 84 can be charged, for example, and without limitation, by physically coupling a power cord to the electronic device 86 or by inductively charging the electronic device 86. Inductively charging of the electronic device 86 can be accomplished by the incorporation or an inductive charging mat in the first and/or second pockets 80, 84. The electronic device 86 stored in one of the first pocket 80 and the second pocket 84 can be accessible while the door 66 of the compartment 32 is in either the open or closed position. In the embodiment shown in FIG. 6, access to the electronic device 86 stored in the compartment 32 is provided by an aperture 88 that is maintained between the door 66 of the compartment 32 and the side portion 36 of the seatback 28 while the compartment 32 is in the closed position. At least a portion of the first and/or second pocket 80, 84 can be lined with a thermal reflective material that creates a thermal barrier between the interior of the compartment 32 and the vehicle cabin 56 (FIG. 1).

Figure 7:
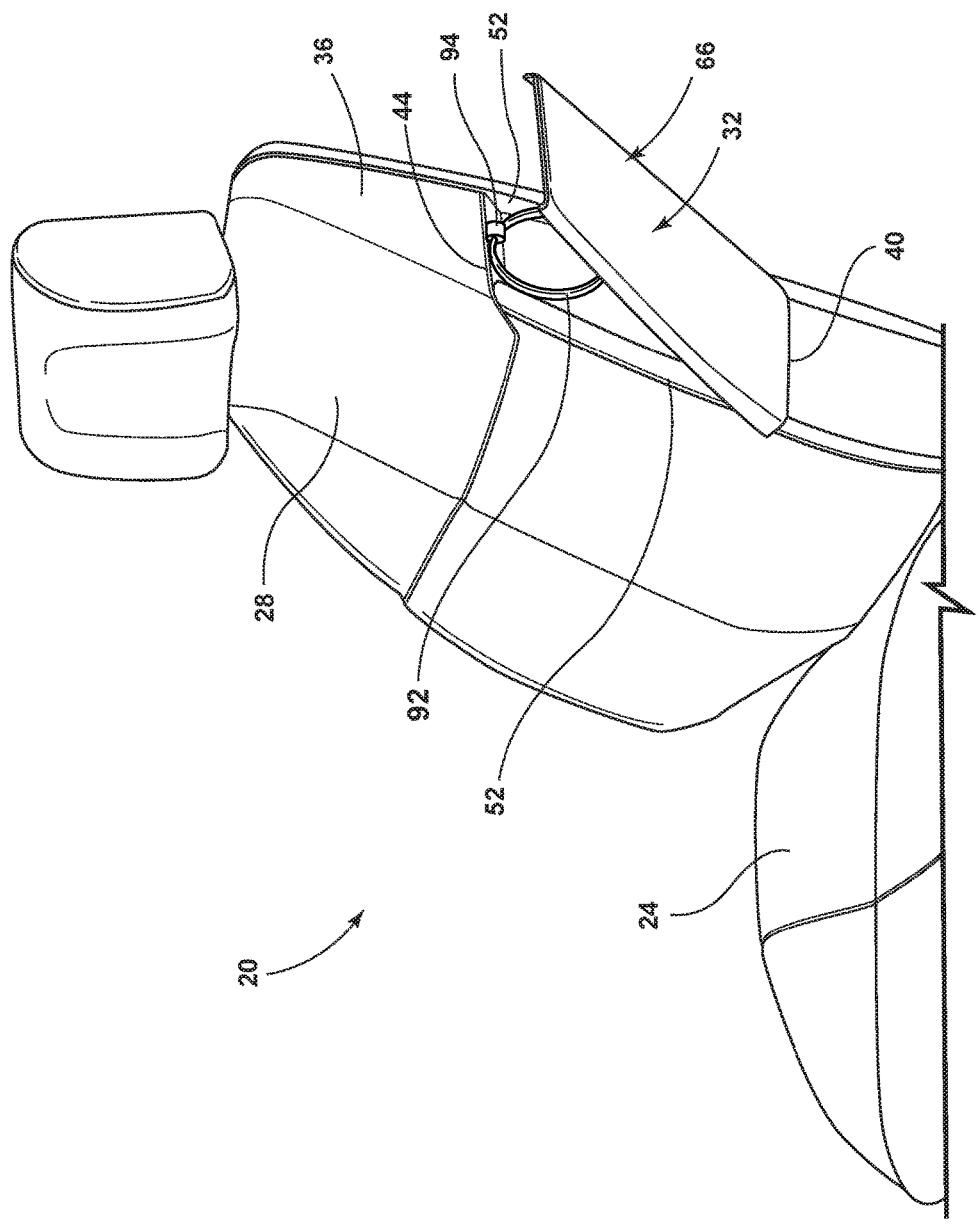
FIG. 7 is a side perspective view of the vehicle seating assembly having the storage compartment in the open position, according to another embodiment.
Figure 8:
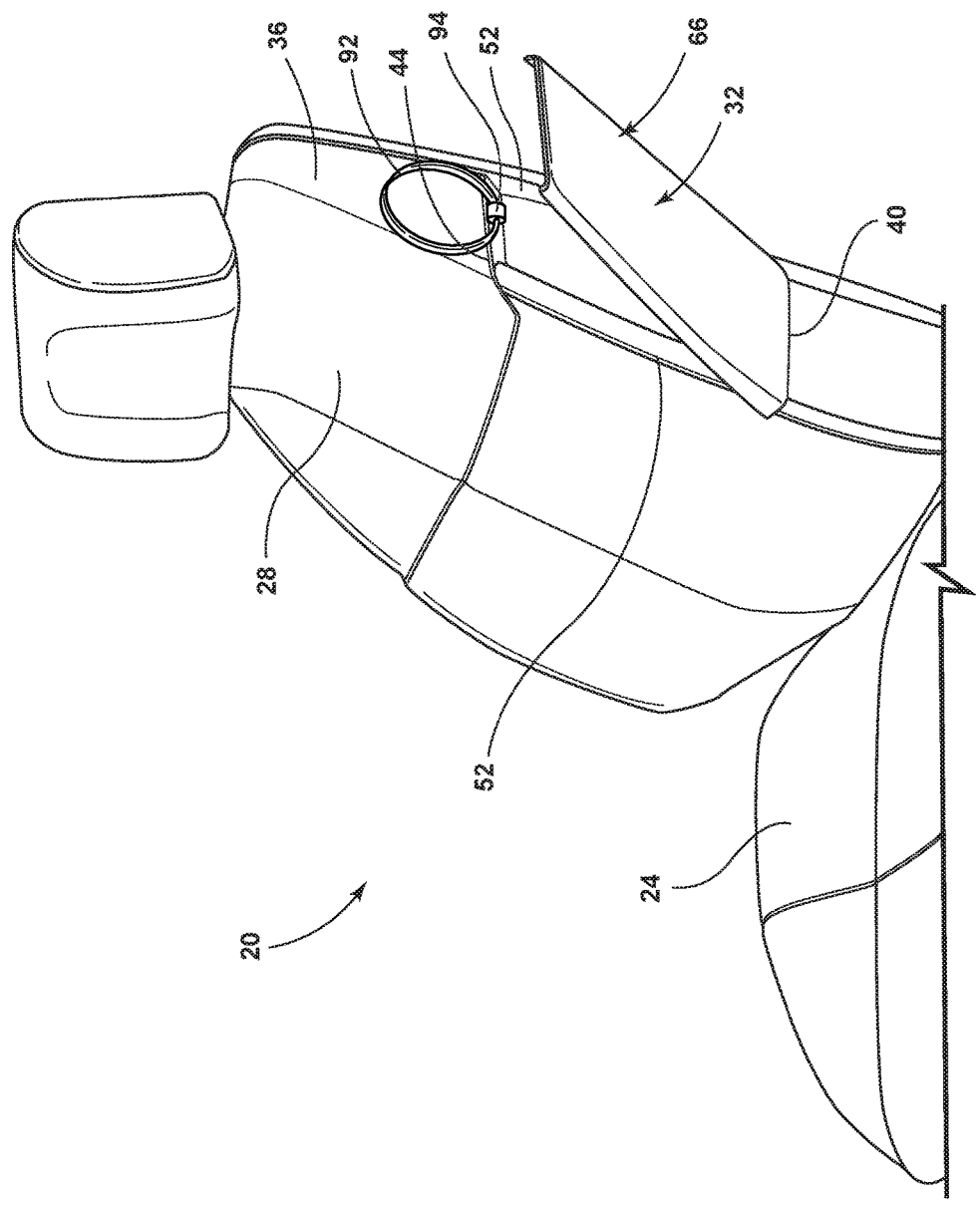
FIG. 8 is a side perspective view of the vehicle seating assembly shown in FIG. 7, having the storage compartment in the open position with a cup holder in an extended position.
Figure 9:
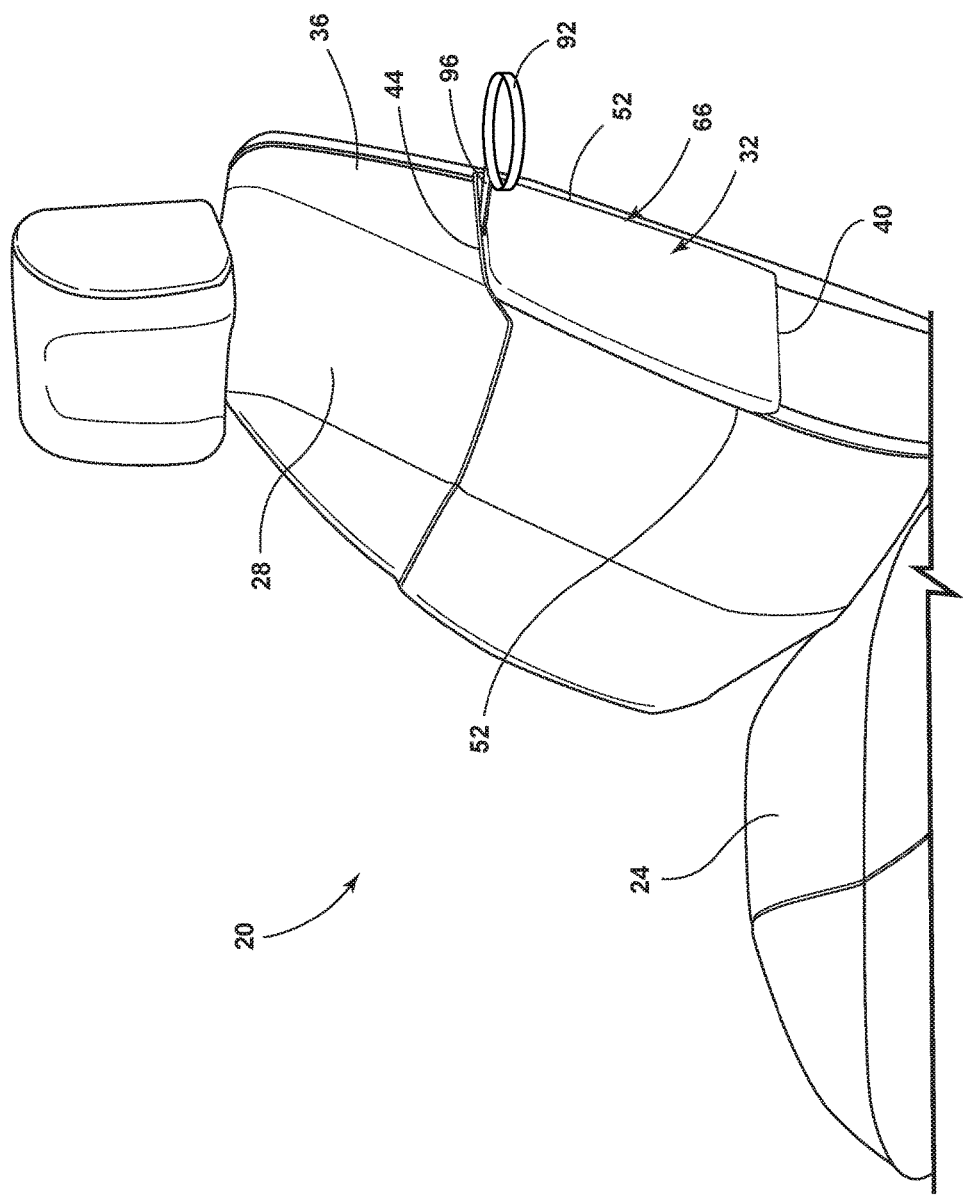
FIG. 9 is a side perspective view of the vehicle seating assembly, similar to FIG. 7, having the storage compartment in the closed position.

Referring to FIGS. 7-9, the compartment 32 of the vehicle seating assembly 20 can be equipped with a cup holder 92 according to a further embodiment. The cup holder 92 is movable between a first position and a second position. The first position and the second position of the cup holder 92 can be, for example, a stowed position (FIG. 7) and a deployed position (FIG. 9), respectively. While the cup holder 92 is in the stowed position, the cup holder 92 is pivoted downward in a vertical direction and does not interfere with other functionalities of the compartment 32. The cup holder 92 can be pivotably coupled to the side portion 36 of the seatback 28. The pivotable coupling of the cup holder 92 to the side portion 36 can be accomplished, for example, by a hinge 94 such as a three-way hinge. When a user desires to deploy the cup holder 92, the user opens the compartment 32, pivots the cup holder 92 from the downward vertical stowed position to an upward vertical position (FIG. 8). Next, the user closes the door 66 of the compartment 32 and pivots the cup holder 92 downward to the horizontal deployed position shown in FIG. 9. The cup holder 92 can now be used by at least one of a front passenger and a rear passenger of the vehicle cabin 56. While the cup holder 92 is shown in the deployed position when the door 66 of the compartment 32 is in the closed position, one of skill in the art will recognize that the cup holder 92 can be configured to be useable while the door 66 of the compartment 32 is in either the open position or the closed position. Additionally, while the cup holder 92 is shown as directly coupled to the hinge 94, an intermediate support 96 can extend between the cup holder 92 and the hinge 94. The intermediate support 96 facilitates extension of the cup holder 92 further from the side portion 36 of the seatback 28. By extending the distance between the cup holder 92 and the side portion 36, access to a beverage stored in the cup holder 92 can be easier to grasp and remove from the cup holder 92.

Figure 10:
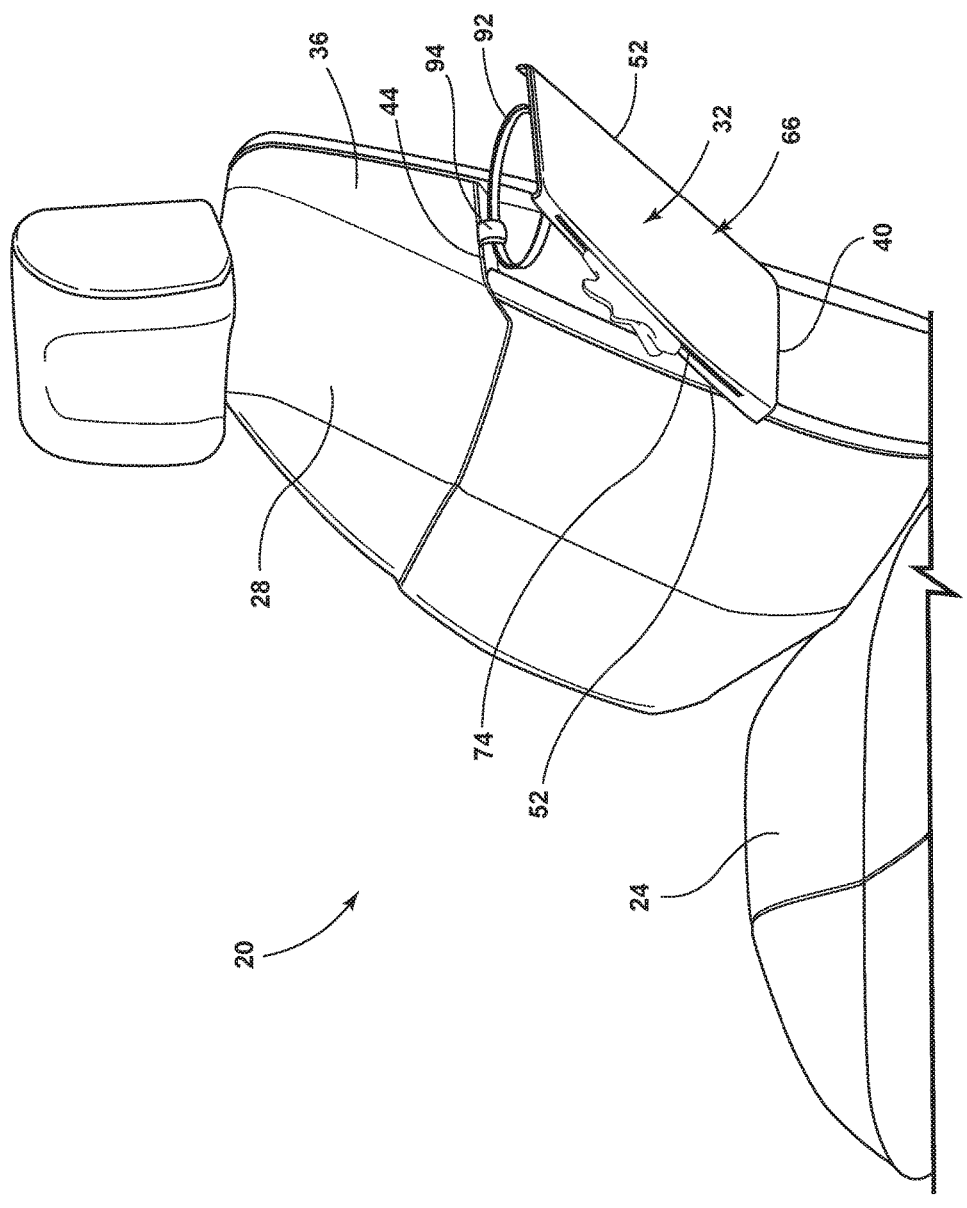
FIG. 10 is a side perspective view of the vehicle seating assembly shown in FIG. 7 having the storage compartment in the open position, according to another embodiment.
Figure 11:
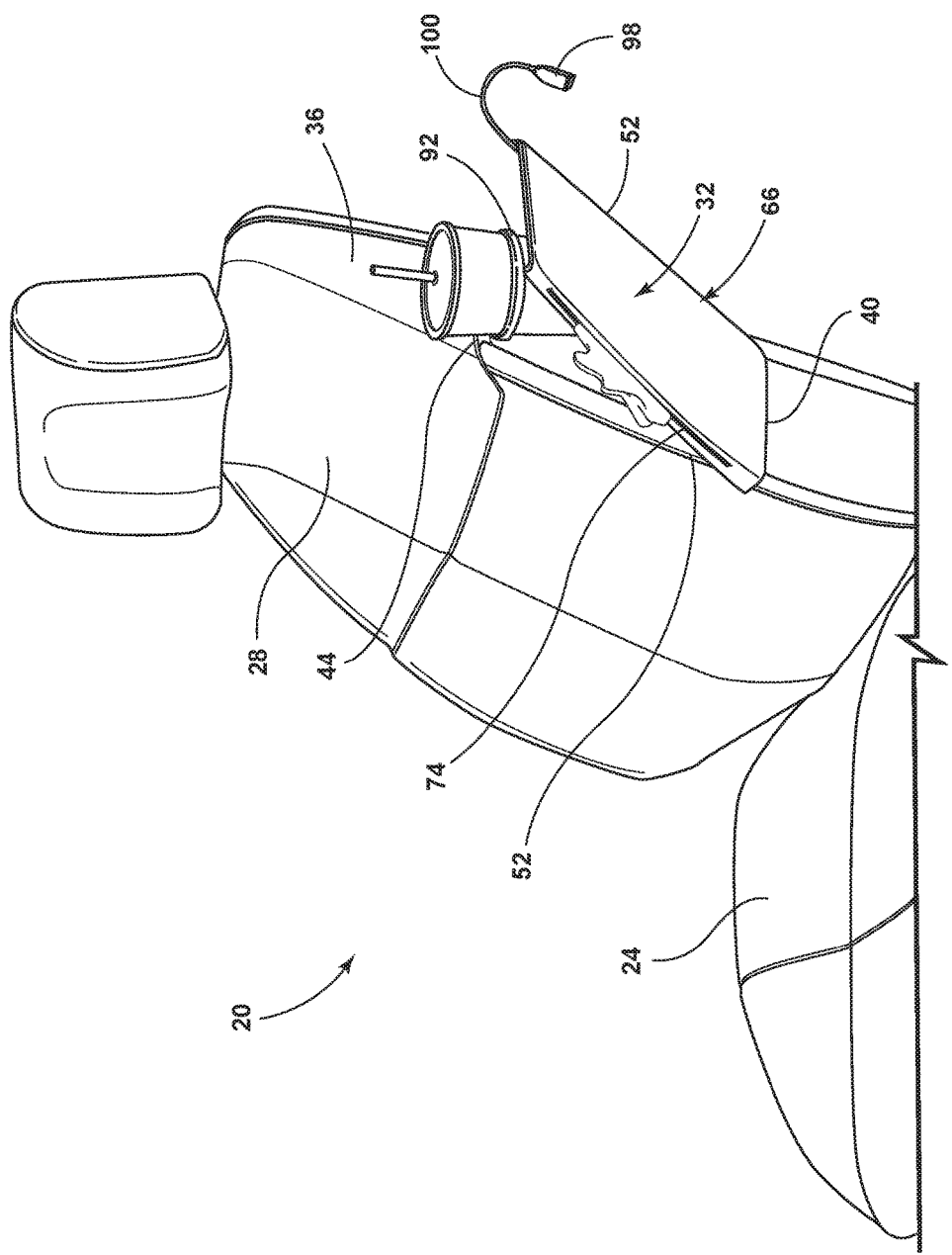
FIG. 11 is a side perspective view of the vehicle seating assembly shown in FIG. 10, having the storage compartment in the open position, according to another embodiment.

Referring to FIGS. 10 and 11, the compartment 32 of the vehicle seating assembly 20 can include a variety of functionalities according to other embodiments. The compartment 32 can be equipped with the tissue holder 74 in the door 66 of the compartment 32 and simultaneously be equipped with the cup holder 92. The cup holder 92 depicted in FIG. 10 shows an embodiment of the cup holder 92 that is usable in a horizontal use position while the door 66 of the compartment 32 is in either the open or closed position. In certain embodiments shown, the retention material 48 is not present. However, one of skill in the art will recognize the various functionalities discussed herein can be used individually or in any combination without departing from the concepts disclosed herein. An additional functionality of a light source 98 is depicted in FIG. 11. The light source 98 can be operably coupled to the door 66 of the compartment 32. Alternatively, the light source 98 can be operably coupled to the side portion 36 of the seatback 28 at the recessed edges 62 or the planar central region 64. The light source 98 can be equipped with an adjustable arm 100. The adjustable arm 100 enables a user to employ the light source 98 to illuminate any area that they desire within the vehicle cabin 56 (FIG. 1). For example, the light source 98 can be used to illuminate the interior of the compartment 32 (e.g. the first and/or the second pocket 80, 84), the center console 60 (FIG. 1), the vehicle seating assembly 20 in the rear of the vehicle cabin 56, the interior of a hand bag, or reading material for a passenger within the vehicle cabin 56.

Storage compartments 32 in vehicles are often highly sought after by consumers. The storage compartments 32 are utilized on a regular basis and for various purposes. However, many storage compartments 32 may be out of easy reach of the driver of the vehicle. Additionally, the storage compartments 32 are often provided for a single functionality. The compartment 32 disclosed herein provides a multi-functional solution that is centrally located in the vehicle cabin 56 relative to passengers in the front of the vehicle and passengers in the rear of the vehicle. By so positioning the compartment 32, the multiple functionalities of the compartment can be utilized by front seat and rear seat passengers exclusively or simultaneously. Further, due to the location in the seating assembly 20 the compartment 32 disclosed herein is positioned closer to a driver of the vehicle than many storage compartments 32 in use today (e.g. the glove box, seatback pockets, etc.).

Consumers that live in areas that experience outside temperatures that exceed normal room temperatures (e.g. 20-25° C.) often experience the misfortune of having food or personal care products (e.g. lip balm, lipstick, and the like) melt in their vehicles as they warm in the sun. The thermal reflective material disclosed herein mitigates or eliminates this common issue by creating a thermal barrier between the interior of the compartment 32 and the vehicle cabin 56. Similarly, the thermal reflective material can provide a thermal barrier between the interior of the compartment 32 and the vehicle cabin 56 that prevents items retained within the compartment 32 from freezing or generally becoming too cold in cold temperatures and climates.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
    a seat;
    a seatback; and
    a compartment in a side portion of the seatback, wherein the compartment is pivotably coupled to the side portion at a lower region and resiliently coupled to the side portion at an upper region, and wherein the resilient coupling of the side portion at the upper region biases the compartment to a fully-closed position, and wherein the compartment is equipped with retention material along vertical sections of the compartment that retain items stored in the compartment when the compartment is in an open position.

2. The vehicle seating assembly of claim 1, wherein at least a portion of the compartment is lined in a thermal reflective material that creates a thermal barrier between an interior of the compartment and a vehicle cabin.

3. The vehicle seating assembly of claim 1, wherein the compartment further comprises:
    a tissue holder that is unitarily formed with a door of the compartment, wherein the tissue holder is accessible when the compartment is in the open position and the closed position.

4. The vehicle seating assembly of claim 1, wherein the compartment further comprises:
    one or more straps operably coupled to an exterior surface of a door of the compartment.

5. A vehicle seating assembly comprising:
    a seat;
    a seatback; and
    a compartment in a side portion of the seatback, wherein the compartment is pivotably coupled to the side portion at a lower region and resiliently coupled to the side portion at an upper region, and wherein the resilient coupling of the side portion at the upper region biases the compartment to a fully-closed position.

6. The vehicle seating assembly of claim 5, wherein the compartment is equipped with retention material along vertical sections of the compartment that retain items stored in the compartment when the compartment is in an open position.

7. The vehicle seating assembly of claim 5, further comprising:
    a cup holder operably coupled to the side portion of the seatback.

8. The vehicle seating assembly of claim 7, wherein the cup holder is deployable for use by at least one of a front passenger and a rear passenger.

9. The vehicle seating assembly of claim 7, wherein the cup holder is accessible after deployment independent of whether a door of the compartment is in an open position or a closed position.

10. The vehicle seating assembly of claim 5, wherein the compartment is equipped with a light source that is coupled to an interior of a door of the compartment.

11. The vehicle seating assembly of claim 10, wherein the light source is configured to selectively illuminate at least one of the compartment and a center console of a vehicle.

12. A vehicle seating assembly comprising:
    a seat;
    a seatback; and
    a compartment in a side portion of the seatback, wherein the compartment is pivotably and resiliently coupled to the side portion, and wherein the resilient coupling biases the compartment to a fully-closed position.

13. The vehicle seating assembly of claim 12, wherein the compartment further comprises:
    at least one pocket located within the compartment.

14. The vehicle seating assembly of claim 13, wherein the at least one pocket includes a first pocket and a second pocket.

15. The vehicle seating assembly of claim 14, wherein at least one of the first pocket and the second pocket are lined with a thermal reflective material that creates a thermal barrier between the interior of the compartment and a vehicle cabin.

16. The vehicle seating assembly of claim 14, wherein the first pocket is larger than the second pocket.

17. The vehicle seating assembly of claim 14, wherein the first pocket is provided with electric power.

18. The vehicle seating assembly of claim 17, wherein the electric power provided to the first pocket is used to charge an electronic device within the first pocket.

19. The vehicle seating assembly of claim 18, wherein the electronic device in the first pocket is charged inductively.

\* \* \* \* \*